United States Patent
Farhan et al.

(10) Patent No.: US 8,994,492 B2
(45) Date of Patent: Mar. 31, 2015

(54) DISABLEMENT OF USER DEVICE FUNCTIONALITY

(76) Inventors: Fariborz M Farhan, Johns Creek, GA (US); Babak Firoozbakhsh, Marietta, GA (US); Afshin Amini, Alpharetta, GA (US)

(*) Notice: Subject to any disclaimer, the term of this patent is extended or adjusted under 35 U.S.C. 154(b) by 144 days.

(21) Appl. No.: 13/454,055

(22) Filed: Apr. 23, 2012

(65) Prior Publication Data

US 2012/0268235 A1 Oct. 25, 2012

Related U.S. Application Data

(60) Provisional application No. 61/477,681, filed on Apr. 21, 2011.

(51) Int. Cl.

| | | |
|---|---|---|
| G05B 23/02 | (2006.01) | |
| G08B 21/00 | (2006.01) | |
| B60Q 1/54 | (2006.01) | |
| H04Q 5/22 | (2006.01) | |
| B60R 25/10 | (2013.01) | |
| G08B 23/00 | (2006.01) | |
| H04B 1/06 | (2006.01) | |
| G05B 9/02 | (2006.01) | |

(52) U.S. Cl.
CPC .............. *G05B 9/02* (2013.01); *G05B 23/0278* (2013.01)
USPC ........ 340/3.1; 340/686.1; 340/466; 340/10.4; 340/429; 340/500; 455/238.1

(58) Field of Classification Search
USPC .............. 340/3.1, 439, 670, 10.1, 466, 568.1, 340/10.4, 539.13, 10.33, 686.1, 429, 500; 455/41, 456, 39, 457, 456.1, 41.3, 455/238.1, 67.11, 68, 26.1; 235/375
See application file for complete search history.

(56) References Cited

U.S. PATENT DOCUMENTS

| | | | |
|---|---|---|---|
| 2005/0173509 A1* | 8/2005 | Miettinen | 235/375 |
| 2005/0258955 A1* | 11/2005 | Gloekler et al. | 340/539.13 |
| 2007/0072553 A1* | 3/2007 | Barbera | 455/67.11 |
| 2008/0180244 A1* | 7/2008 | Howarth et al. | 340/568.1 |
| 2009/0002147 A1* | 1/2009 | Bloebaum et al. | 340/466 |
| 2009/0224931 A1* | 9/2009 | Dietz et al. | 340/670 |
| 2010/0087137 A1 | 4/2010 | Fischer et al. | |
| 2010/0123560 A1* | 5/2010 | Nix et al. | 340/10.4 |
| 2011/0021234 A1 | 1/2011 | Tibbitts et al. | |
| 2011/0063098 A1* | 3/2011 | Fischer et al. | 340/439 |
| 2011/0077032 A1 | 3/2011 | Correal et al. | |
| 2011/0084807 A1* | 4/2011 | Logan et al. | 340/10.1 |
| 2011/0267185 A1 | 11/2011 | Zhang et al. | |

FOREIGN PATENT DOCUMENTS

WO  WO 2011085250 A1 * 7/2011

* cited by examiner

*Primary Examiner* — Mirza Alam
(74) *Attorney, Agent, or Firm* — Smith Risley Tempel Santos LLC; Gregory Scott Smith

(57) ABSTRACT

The use of user equipment, or distracting features thereof are restricted or prohibited to improve vehicle operation safety. The presence of user equipment within the operator's or driver's operational area is detected. The distracting features are then restricted either immediately or based on other conditions such as vehicle speed, motion, engine state, etc. When the conditions have been eliminated and/or the user equipment is vacated from the operator's operational area, the restrictions can be removed or removed after a threshold period of time.

26 Claims, 8 Drawing Sheets

DISABLEMENT OF USER DEVICE FUNCTIONALITY

CROSS-REFERENCE TO RELATED APPLICATIONS

This is a utility patent application being filed in the United States as a non-provisional application for patent under Title 35 U.S.C. §100 et seq. and 37 C.F.R. §1.53(b) and, claiming the benefit of the prior filing date under Title 35, U.S.C. §119(e) of the United States provisional application for patent that was filed on Apr. 21, 2011, assigned Ser. No. 61/477,681 and bearing the title of METHODS AND SYSTEM TO DISABLE DRIVER TEXT-MESSAGING TO PREVENT ACCIDENTS, which application is incorporated herein by reference in its entirety.

BACKGROUND

There have been numerous reports in media in recent years about automobile and train accidents while the driver was text-messaging or performing other distracting activities on his/her handset, which may include a portable telephone, a cellular telephone, a smart phone, a personal data assistant (PDA), wireless computer such as iPhone, iPads, ANDROIDS, BLACKBERRYS, etc. According to the Governors Highway Safety Association bulletin available online at the following Internet address: ghsa.org, 37 states, the District of Columbia and Guam now ban text messaging for all drivers. In 34 of these states, as well as the District of Columbia and Guam, primary enforcement is used while the others employ secondary enforcement. An additional 6 states prohibit text messaging by novice drivers. Many states include a category for cell phone/electronic equipment distraction on police accident report forms. Recently, proposed federal legislation would require states to collect this data in order to qualify for certain federal funding.

Although statistics may vary greatly, according to researchers from the University of North Texas health Science Center in Ft. Worth, texting behind the wheel accounted for 16,141 deaths between 2002 and 2007. Further, the percentage of all traffic deaths caused by distracted driving rose from 11% in 1999 to 16% in 2008. This is more emphasized by the statistic that only one-third of Americans had a cell phone in 1999 and by 2008, 91% of Americans owned a cell phone.

Clearly there is a need in the art for reducing or preventing car and other motor vehicle accidents caused by drivers' distraction due to reading or sending SMS text messages on their mobile device. And although the danger arises from the driver's activity, the other passengers as well as innocent by standers or drivers would also benefit from a solution that would help prevent such accidents. Thus, there is a need in the art for a solution to amplify the safety of occupants of a motor vehicle and by standers by mitigating the possibility of driver distraction due to receiving and/or sending/replying to text messages on his or her mobile phone while operating a motor vehicle.

Although the trend has clearly shown that law enforcement is doing its fair share to mitigate these risks, similar to the law enforcement requirements for wearing seat belts, vehicle operators will always tend to ignore the law. As such, there is a need in the art that can proactively operate to eliminate or reduce the ability to receive and/or text while operating a vehicle.

BRIEF SUMMARY

The present disclosure presents techniques to identify the user equipment using RFID or other short-range wireless communication and the proximity of the user equipment to a driver's ROI. Once the presence of user equipment within the operator's or driver's operational area is detected, distracting features can then be restricted either immediately or based on other conditions such as vehicle speed, motion, engine state, etc. When the conditions have been eliminated and/or the user equipment is vacated from the operator's operational area, the restrictions can be removed, relaxed or removed after a threshold period of time.

DETAILED DESCRIPTION OF VARIOUS EMBODIMENTS

This disclosure presents various embodiments, as well as features and aspects thereof, directed towards providing a solution that disables distracting activities while driving a vehicle. One of the challenges in such a solution is to be able to identify the driver's equipment (e.g., cellular telephone, BLACKBERRY, IPAD, IPHONE, e-mail or text messaging or web-surfing device, GPS, etc.). Thus, one aspect that can be included in various embodiments is the ability to identify equipment utilized by the driver and disable that equipment. For instance, it should be a goal to disable the activities of the driver but to still allow the other occupants of the vehicle to utilize their equipment for such activity.

Other applications can also benefit from such driver identification. For example, cars that include a built in BLUETOOTH functionality may use this capability to automatically connect the correct person's handset to the BLUETOOTH functionality (e.g., the driver's handset to the speaker/microphone system in driver's side).

Throughout this disclosure, various terms are used to describe general classes or categories of technology and the use of such terms should not be construed as limitations on the various embodiments, aspects or features but rather, the term are used to help simplify the description. Some of these terms include the following:

The term "tag" is used to represent an RFID tag or any short-range wireless transmitter.

The term "detector" is used to represent an RFID detector or any wireless receiver capable of detecting the wireless transmitter, such as a tag.

Figure 1:
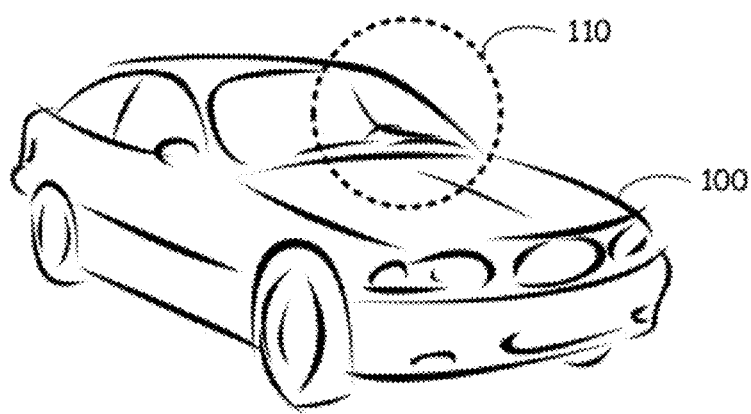
FIG. 1 is a conceptual diagram of exemplary areas that define the driver's ROI.
Figure 1:
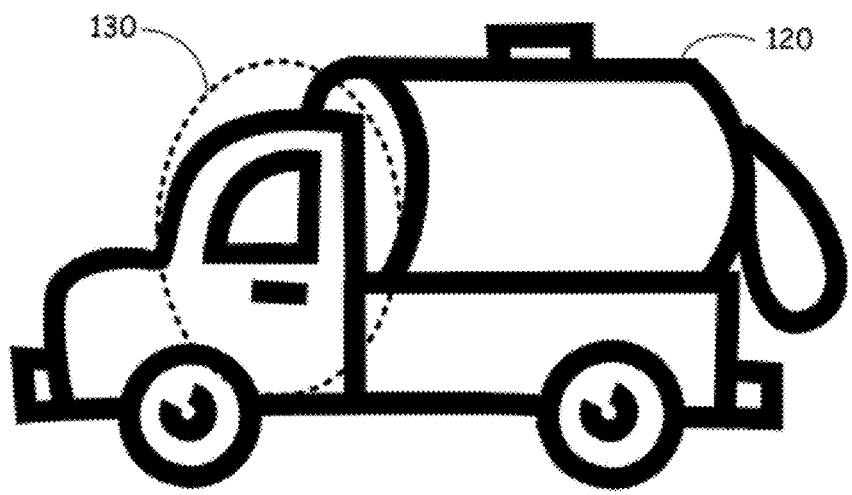

The term "driver's quadrant" or driver's region of interest ("driver's ROI") is used to represent the region that is proximate, close to or surrounding the driver (i.e., the space that is usually associated as being within the driver's reach or "belonging to the driver" or some space within which the tag or detector used to identify the driver can be placed). FIG. 1 is a conceptual diagram of exemplary areas that define the driver's ROI. Vehicle 100 is shown as including an ROI 110 and vehicle 120 illustrates ROI 130. It should be appreciated that any motorized vehicle, such as an automobile, truck, motorcycle, boat, plane, etc. could benefit from the disclosed embodiments as well as non-vehicle equipment such as heavy machinery, farm equipment, etc. It should also be appreciated the driver's ROI, although illustrated as being on the left side of the car, could also be on the right side for other countries. In fact, the ROI could be any particular region within the vehicle, such as in back of a fire truck, in the engine room of a train, or even relative to critical zones around equipment that is being operated (such as at the entrance chute of a wood chipper machine, etc.

Furthermore, the disclosure refers to the detector "identifying" the tag. In such situations, "identify" means more than just sensing the tag. Many techniques such as signal strength/signal-to-noise ratio (SNR), time of arrival, etc., can be used to detect the proximity of the tag. However, wireless technologies (e.g., RF/RFID, UWB, BLUETOOTH) are susceptible to challenges such as multipath and interference. It is sometimes possible to receive signals from unintended tags that are not within the driver's ROI, or sometimes it's possible to receive degraded or weak signals (or even not receive any signals) from the intended tag. Different algorithms may be incorporated to identify the tag correctly. As a non-limiting example, time diversity may be incorporated in detecting the correct tag. This technique operates by combining/averaging the signals over time, using specific correlation receivers, or by requiring N subsequent detections of the same handset as a driver's handset before actually recognizing/identifying it as the driver's), or using other algorithms that minimize false handset detection.

The terms "handset", "equipment" and "hand-held device" are used herein to refer to an electronic device, usually with a transmitter and receiver (or transceiver) used for various types of personal communications. Such personal communications may include, but are not limited to e-mail, text-messaging/SMS, Internet surfing/download/upload or/and storage of information, TWEETS, FACEBOOK postings, blog postings, etc. Furthermore, other technologies and capabilities that may be developed in the future are also anticipated by the present disclosure. A few non-limiting examples of such handsets include personal data assistants (PDA), wireless computers such as iPhones, iPads, ANDROIDS, BLACKBERRYS, etc.

The term "distracting functionalities/services" is used to describe any or a combination of those handset functionalities or services that may be distracting to the user while driving, such as text messaging, Internet, typing, E-mail, keyboard/touch screen, certain communication functionalities, or notifications such as sounds/messages/displays/vibrations, etc.

In general, the various embodiments presented herein operate to restrict or prevent distractions to the operator of a vehicle by (a) defining conditions under which such distractions could be problematic, (b) detecting when the conditions are satisfied, and then (c) restricting operations of the user equipment when such conditions are satisfied. These capabilities are presented in various forms throughout this disclosure. The various embodiments presented, as well as variants thereof may not utilize all of the techniques presented herein but in general, will operate to define, detect and restrict.

Figure 2:
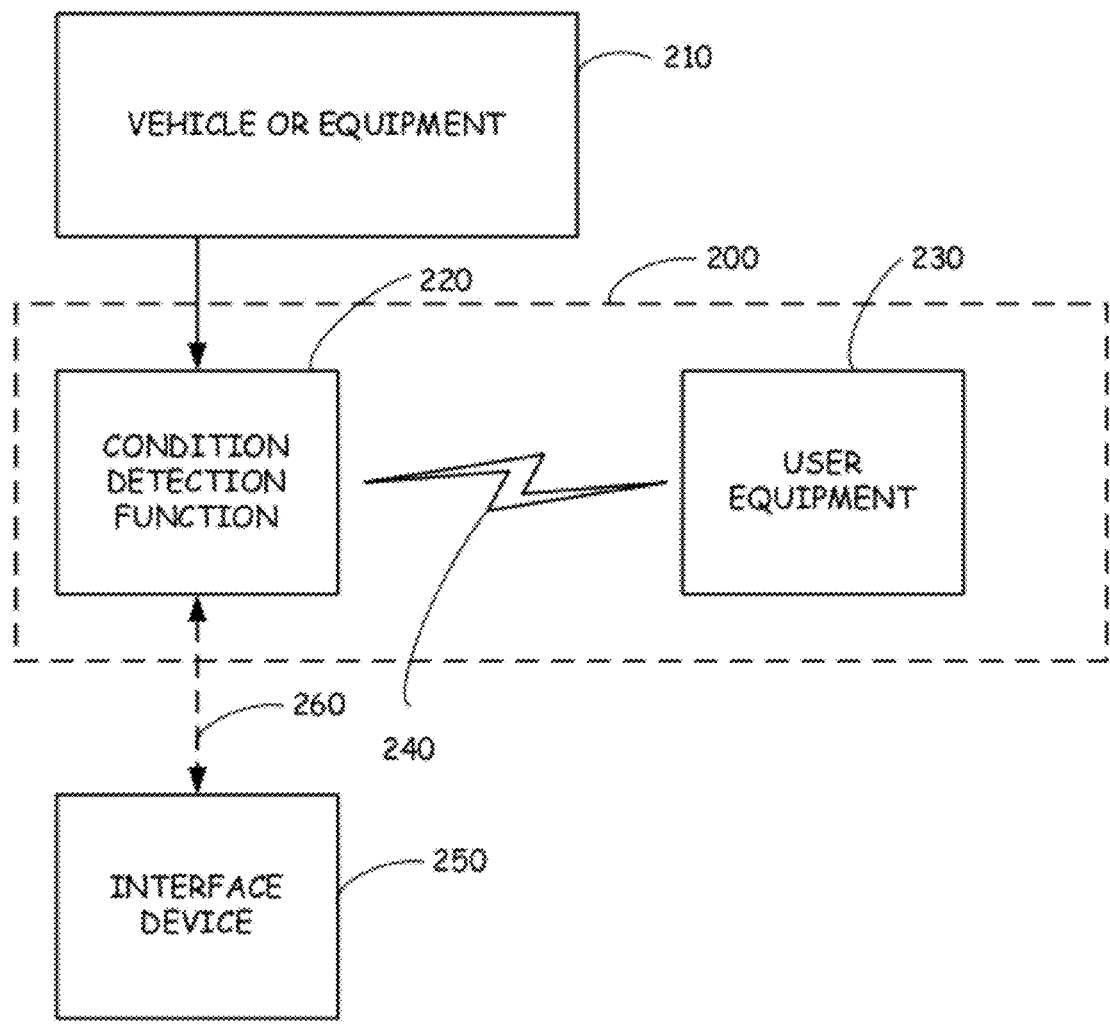
FIG. 2 is a system diagram illustrating the elements of one exemplary embodiment.

FIG. 2 is a system diagram illustrating the elements of one exemplary embodiment. The illustrated system 200 includes a condition detection function 220 that interfaces to the user equipment 230 over a communications link 240. It should be appreciated that the communications link 240 may include any of a variety of wireless or wired technologies, including but not limited to, INFRARED, BLUETOOTH, WiFi, RF, etc. In operation, the condition detection function 220 interfaces to the vehicle or equipment 210 to detect if and when conditions are satisfied for imposing restrictions on the operation of the user equipment 230. The conditions can be preprogrammed into the condition detection function 220, can be hardcoded into the software of the condition detection function, can be embedded as part of the circuitry/hardware of the condition detection function 220 (such as a chip or series of chips or a plug in module such as a USB jump drive etc.) or can be loaded into the condition detection function 220 by a user/operator. For instance, if the vehicle is operated by a child, the parent could define and program the conditions into the condition detection function 220 using interface device 250 through programming interface 260. Alternatively, the condition detection function may include a direct interface to allow programming of the conditions, such as a keypad and display as a non-limiting example. In addition, the user equipment 230 or a similar device could be used to program the conditions into the condition detection function over the communications link 240. In some embodiments, the ability to program the conditions into the condition detection function may be password protected or use some other security or anti-tampering technology to prevent the operation of the condition detection function from being inhibited, disabled, spoofed or otherwise altered.

As a specific and non-limiting example, the condition detection function 220 may be incorporated into a car-pluggable device that can be inserted into a cigarette lighter receptacle (12 volt receptacle) and includes a BLUETOOTH communication system for interfacing to a BLUETOOTH enabled user equipment 230.

As another specific and non-limiting example, the condition detection function 220 may be a device installed within the vehicle, such as a car-PC apparatus within the console or otherwise installed within the vehicle. Such car-PC or other device may include BLUETOOTH communications technology for interfacing to a BLUETOOTH enabled user equipment 230. The car-PC detects conditions, such as speed by reading the vehicle speedometer via the internal bus of the vehicle. The car-PC then imposes the restrictions on the user equipment 230.

Figure 3:
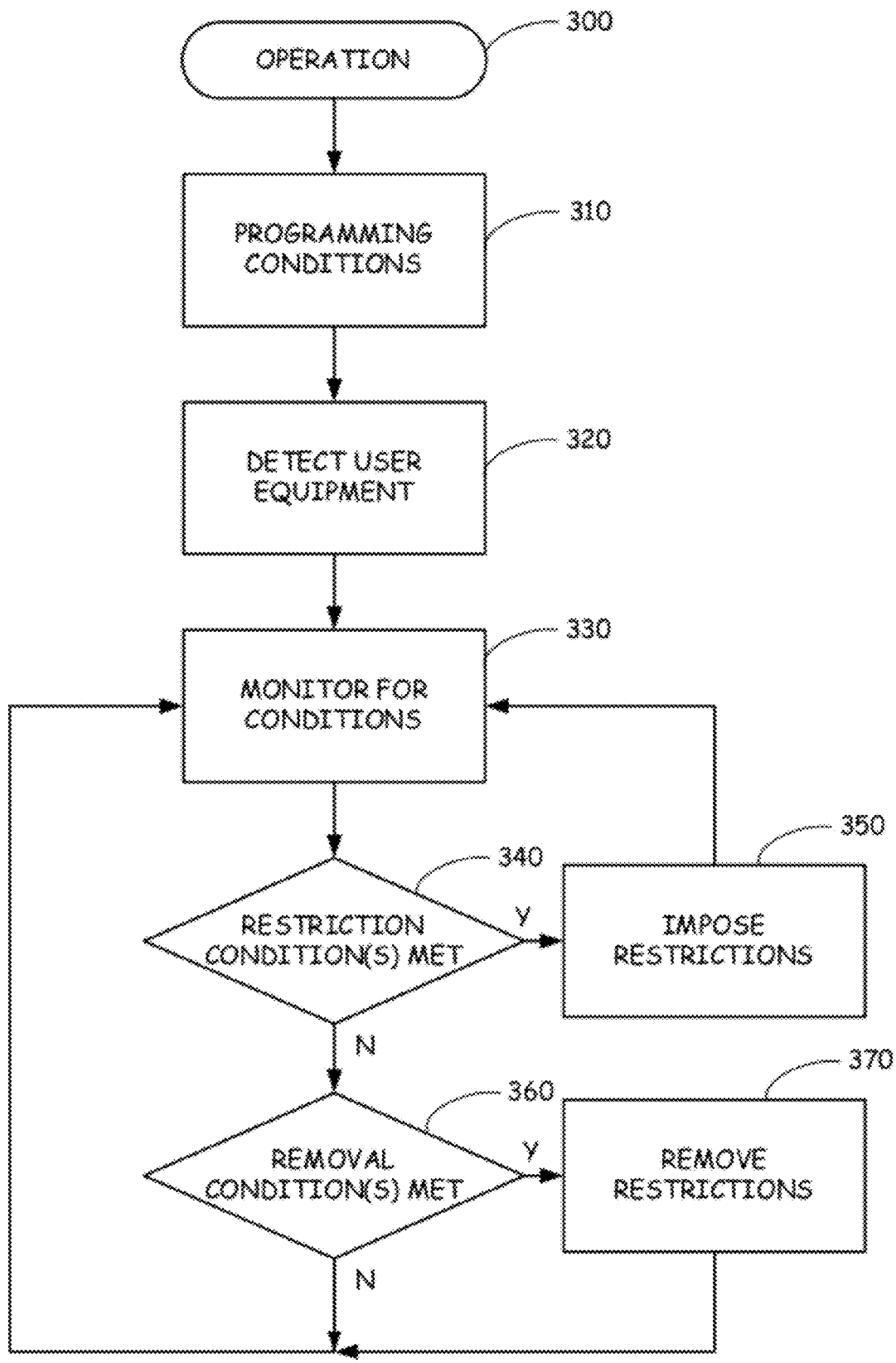
FIG. 3 is a flow diagram illustrating an exemplar operation of the system illustrated in FIG. 2.

FIG. 3 is a flow diagram illustrating an exemplar operation of the system illustrated in FIG. 2. The exemplary operation 300, when commenced, may, in necessary, first include the action of obtaining programming conditions 310. As previously described, this can be preprogrammed into the condition detection function 220 prior to operation or can be programmed by a user/operator at any time once the system is in use depending on the particular embodiments. For instance, a rental car company may evaluate a potential renter, their driving record, their age, their insurance coverage etc., and program the condition detection device accordingly. Likewise, an insurance company may impose or program certain conditions into the condition detection function 220. Other examples also include, but are not limited to, parents, companies, agencies, etc., imposing or programming conditions into the condition detection function 220. Thus, in some embodiments, the action of obtaining programming conditions 310 can be accomplished at the time of building the system components and not a part of normal operation. In any case, once the conditions are programmed or associated with the system, the processing unit can read the programming conditions.

Once the conditions are programmed into the condition detection function 220, the condition detection function may also operate to detect the user equipment 230. This action can be performed in a variety of manners and may be autonomous, automatic, manual, etc., or a combination of a variety of techniques. For instance, in one embodiment, a BLUETOOTH peer-to-peer signaling exchange may be utilized by the condition detection function 220 to identify user equipment 230 that is proximate to the condition detection function 220. Further, the condition detection function 220 may utilize technology to determine the location of the user equipment 230 relative to the driver's ROI. In other embodiments, the condition detection device can prevent operation of the vehicle until the operator keys in his or her user equipment identification number (such as a mobile number, MIN, etc.) into the condition detection device and/or registers the user equipment 230 therewith. In yet other embodiments, the condition detection function 220 may simply operate on all user equipment that is within the communication range of the condition detection function 220. In yet another embodiment, the user equipment 230 may be plugged or connected directly to the condition detection function 220.

The condition detection function 220 then commences to monitor for conditions 330. The conditions can be any of a variety of conditions and combinations thereof, including but not limited to, motion of the vehicle, speed of the vehicle, time of day, location of the vehicle, type of the vehicle, identification of the operator, etc. If conditions are detected that invoke the imposition of restrictions 350, then the condition detection function 220 causes the restrictions to be imposed on the user equipment 230 and then continues to monitor for conditions 330.

If conditions are not detected that would invoke the imposition of restrictions 340, then in some embodiments, the conditions may be evaluated to determine if removal of the imposition of restrictions is warranted 360. If the conditions warrant the removal of restrictions, then any or specific restrictions imposed on the user equipment 230 are removed 370 and the condition detection function 220 again returns to monitor for conditions 330. Although not illustrated, this operation may continue in a loop until a triggering event occurs, such as the vehicle is turned off, the user equipment 230 is removed from the vicinity of the condition detection function 220, etc.

Figure 4:
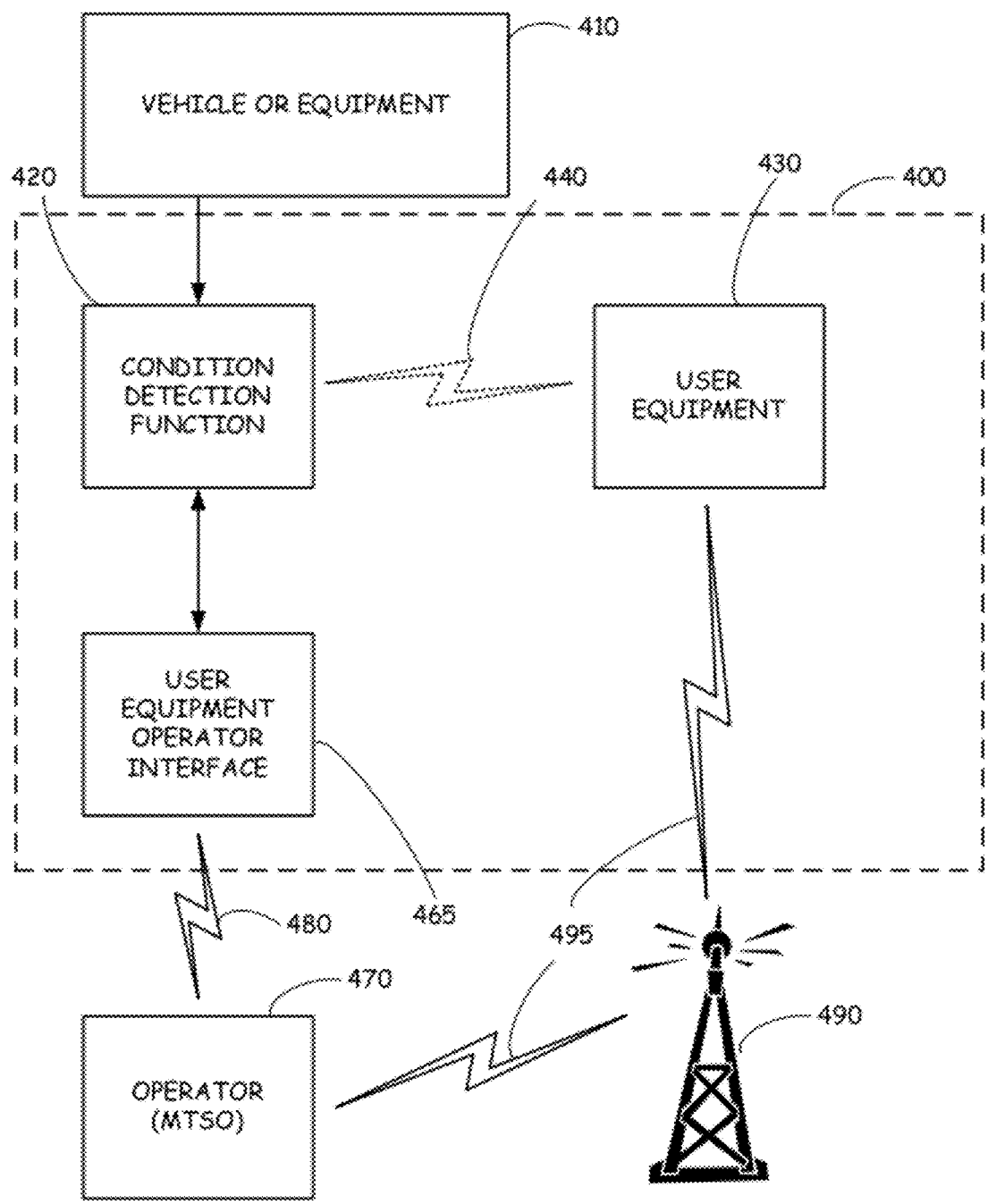
FIG. 4 is a system diagram illustrating the elements of another exemplary embodiment.

FIG. 4 is a system diagram illustrating the elements of another exemplary embodiment. The illustrated system 400 includes a condition detection function 420 that may or may not interface to the user equipment 430 over a communications link 440 depending on the particulars of the embodiment. In operation, the condition detection function 440 interfaces to the vehicle or equipment 410 to detect if and when conditions are satisfied for imposing restrictions on the operation of the user equipment 430. Similar to the embodiment illustrated in FIG. 2, the conditions can be preprogrammed into the condition detection function 420 or can be loaded into the condition detection function 420 by a user/operator (not illustrated in FIG. 4).

The condition detection function 420 interfaces with a user equipment operator interface 465, which in turn interfaces to operator equipment 470 over communications link 480. The user equipment operator interface may be as simple as a signal transmitter the receives a signal from the condition detection function 420 and transmits it to the operator equipment 470, or it may be a complicated device that can engage in communication with the conditions detection function 420 and determine what, if any messages should be sent to the operator equipment 470. In addition, it should be appreciated that some or all of the condition detection functionality can be incorporated into the user equipment operator interface 465. As such, in some embodiments, the user equipment operator interface 465 may supplant the condition detection function 420 altogether.

The operator equipment 470, which in the illustrated example is shown to be a mobile terminal switching operator and/or office (MTSO) as a non-limiting example, communicates with the user equipment 430 over one or more communication links 495 and through communication equipment 490 to impose restriction or relinquish the imposition of restrictions on the user equipment 430.

As a specific and non-limiting example, the condition detection function 420 may be incorporated into a car-pluggable device that can be inserted into a cigarette lighter receptacle (12 volt receptacle) and includes an interface to a GPRS/EDGE/LTE/WiMAX or other similar device that communications with the operator equipment. The car-pluggable device detects conditions, such as the car being in motion and through the embedded or attached cellular modem signals the mobile operator that the driver is in motion. The mobile operator then holds all SMS messages from being forwarded to the user equipment 430.

As another specific and non-limiting example, the condition detection function 220 may be a device installed within the vehicle, such as a car-PC apparatus within the console or otherwise installed within the vehicle. Such car-PC or other device may include an interface to a GPRS/EDGE/LTE/WiMAX or other similar device that communications with the operator equipment. The car-PC detects conditions, such as speed by reading the vehicle speedometer via the internal bus of the vehicle. The car-PC then through the embedded or attached cellular modem signals the mobile operator that the driver is in motion. The mobile operator then holds all SMS messages from being forwarded to the user equipment 530.

The operation of FIG. 3 is now revisited in view of illustrating an exemplar operation of the system illustrated in FIG. 4. The exemplary operation 300 includes the action of programming conditions 310. As previously described, this can be preprogrammed into the condition detection function 420 or can be programmed by a user/operator.

Once the conditions are programmed into the condition detection function 420, the condition detection function may also operate to detect the user equipment 430. This action can be performed in a variety of manners and may be autonomous, automatic, manual, etc., or a combination of a variety of techniques. For instance, in one embodiment, a BLUETOOTH peer-to-peer signaling exchange may be utilized by the condition detection function 420 to identify user equipment 430 that is proximate to the condition detection function 420. Further, the condition detection function 420 may utilize technology to determine the location of the user equipment 430 relative to the driver's ROI. In other embodiments, the condition detection device can prevent operation of the vehicle until the operator keys in his or her user equipment identification number (such as a mobile number, MIN, etc.) into the condition detection device and/or registers the user equipment 430 therewith. In yet other embodiments, the condition detection function 420 may simply operate on all user equipment that is within the communication range of the condition detection function 420. In yet another embodiment, the user equipment 430 may be plugged or connected directly to the condition detection function 420.

The condition detection function 420 then commences to monitor for conditions 330. The conditions can be any of a variety of conditions and combinations thereof, including but not limited to, motion of the vehicle, speed of the vehicle, time of day, location of the vehicle, type of the vehicle, identification of the operator, etc. If conditions are detected that invoke the imposition of restrictions 350, then the condition detection function 420 sends notification to the operator equipment 470 through the user equipment operator interface 465 and communications link 480. The operator equipment 470 may then operate to cause the restrictions to be imposed on the user equipment 430 through the communications links 495 and infrastructure equipment 490. The condition detection function 420 then continues to monitor for conditions 330. If conditions are not detected that would invoke the imposition of restrictions 340, then in some embodiments, the conditions may be evaluated to determine if removal of the imposition of restrictions is warranted 360. If the conditions warrant the removal of restrictions, then the condition detect function 420 sends notification to the operator equipment 470 through the user equipment operator interface 465 and communications link 480. The operator equipment 470 may then operate to cause the restrictions to be removed from the user equipment 430 through the communications links 495 and infrastructure equipment 490. Although not illustrated, this operation may continue in a loop until a triggering event occurs, such as the vehicle is turned off, the user equipment 430 is removed from the vicinity of the condition detection function 420, etc.

Figure 5:
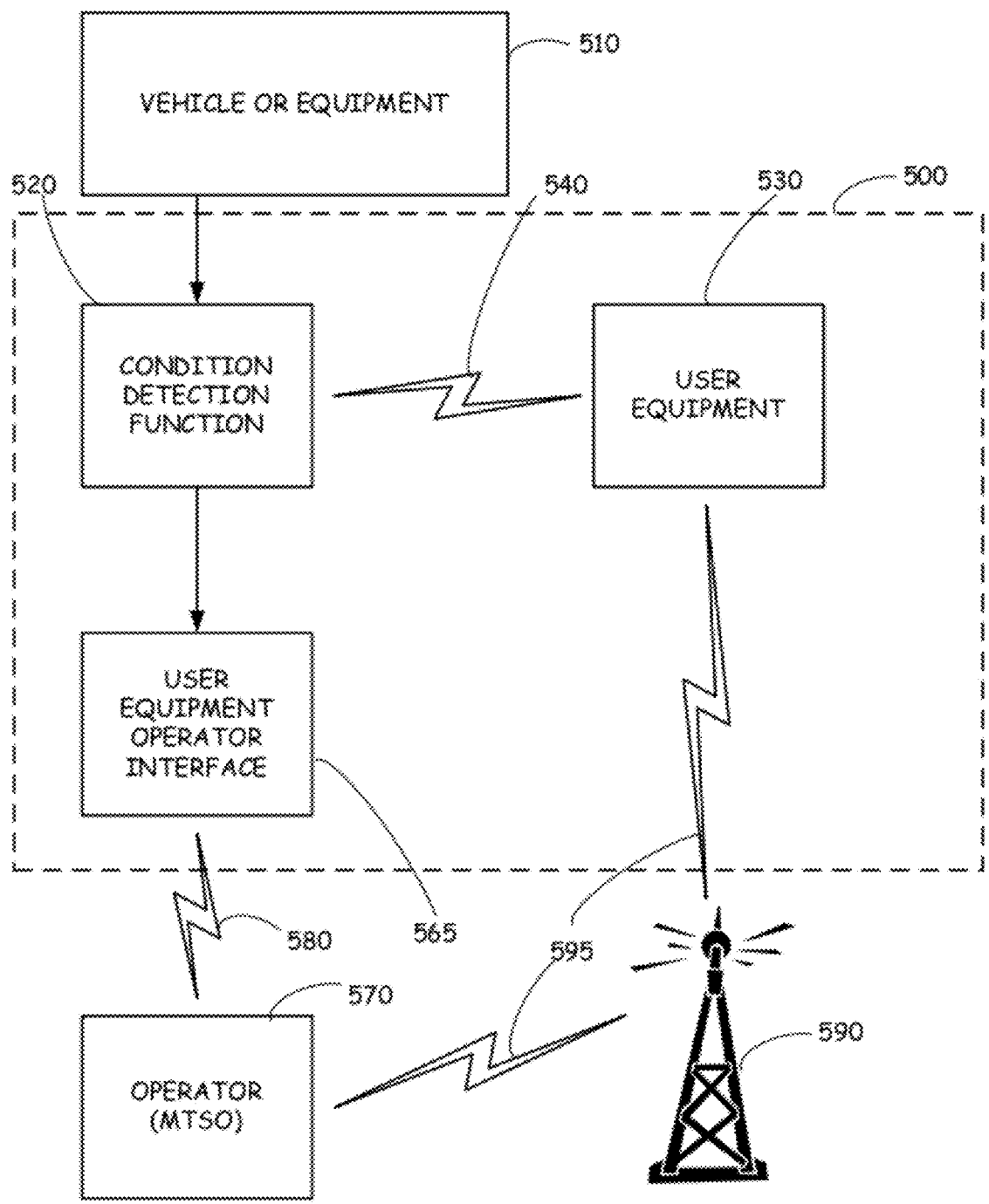
FIG. 5 is a system diagram illustrating the elements of another exemplary embodiment that includes a combination of the systems illustrated in FIG. 2 and FIG. 4.

FIG. 5 is a system diagram illustrating the elements of another exemplary embodiment that includes a combination of the systems illustrated in FIG. 2 and FIG. 4. The illustrated system 500 includes a condition detection function 520 that may or may not interface to the user equipment 530 over a communications link 540 depending on the particulars of the embodiment. In operation, the condition detection function 540 interfaces to the vehicle or equipment 510 to detect if and when conditions are satisfied for imposing restrictions on the operation of the user equipment 530. Similar to the embodiment illustrated in FIG. 2, the conditions can be preprogrammed into the condition detection function 520 or can be loaded into the condition detection function 520 by a user/operator (not illustrated in FIG. 5).

The condition detection function 520 interfaces with a user equipment operator interface 565, which in turn interfaces to operator equipment 570 over communications link 580. The user equipment operator interface may be as simple as a signal transmitter the receives a signal from the condition detection function 520 and transmits it to the operator equipment 570, or it may be a complicated device that can engage in communication with the conditions detection function 520 and determine what, if any messages should be sent to the operator equipment 570. In addition, it should be appreciated that some or all of the condition detection functionality can be incorporated into the user equipment operator interface 565. As such, in some embodiments, the user equipment operator interface 565 may supplant the condition detection function 520 altogether.

The operator equipment 570, which in the illustrated example is shown to be a mobile telephone switching operator and/or office (MTSO) as a non-limiting example, communicates with the user equipment 530 over one or more communication links 595 and through communication equipment 590 to impose restriction or relinquish the imposition of restrictions on the user equipment 530.

The operation of FIG. 3 is now revisited in view of illustrating an exemplar operation of the system illustrated in FIG. 5. The exemplary operation 300 includes the action of programming conditions 310. As previously described, this can be preprogrammed into the condition detection function 520 or can be programmed by a user/operator.

Once the conditions are programmed into the condition detection function 520, the condition detection function may also operate to detect the user equipment 530. This action can be performed in a variety of manners and may be autonomous, automatic, manual, etc., or a combination of a variety of techniques. For instance, in one embodiment, a BLUETOOTH peer-to-peer signaling exchange may be utilized by the condition detection function 520 to identify user equipment 530 that is proximate to the condition detection function 520. Further, the condition detection function 520 may utilize technology to determine the location of the user equipment 530 relative to the driver's ROI. In other embodiments, the condition detection device can prevent operation of the vehicle until the operator keys in his or her user equipment identification number (such as a mobile number, MIN, etc.) into the condition detection device and/or registers the user equipment 530 therewith. In yet other embodiments, the condition detection function 520 may simply operate on all user equipment that is within the communication range of the condition detection function 520. In yet another embodiment, the user equipment 530 may be plugged or connected directly to the condition detection function 520. It should also be appreciated that the user equipment 530 (in this and in other embodiments) may be linked or associated with the condition detection function 520 by the operator equipment 570. For instance, when the user equipment 530 registers with the operator equipment 570, the operator equipment 570 may associate the user equipment 530 with a particular condition detection function 520. This can be accomplished in a variety of manners including identifying the location of the user equipment 530 and the condition detection function 520, or one or more of the condition detection function 520 and user equipment 530 can detect the other and provide this information to the operator equipment 570.

The condition detection function 520 then commences to monitor for conditions 330. The conditions can be any of a variety of conditions and combinations thereof, including but not limited to, motion of the vehicle, speed of the vehicle, time of day, location of the vehicle, type of the vehicle, identification of the operator, etc. If conditions are detected that invoke the imposition of restrictions 350, then the condition detection function 520 may impose the restrictions on the user equipment 530. In addition or alternatively, the condition detection function 520 may send notification to the operator equipment 570 through the user equipment operator interface 565 and communications link 580. The operator equipment 570 may then operate to cause the restrictions to be imposed on the user equipment 530 through the communications links 595 and infrastructure equipment 590. The condition detection function 520 then continues to monitor for conditions 330.

If conditions are not detected that would invoke the imposition of restrictions 340, then in some embodiments, the conditions may be evaluated to determine if removal of the imposition of restrictions is warranted 360. If the conditions warrant the removal of restrictions, then the condition detect function 520 removes the restrictions on the user equipment 530 and/or sends notification to the operator equipment 570 through the user equipment operator interface 565 and communications link 580. The operator equipment 570 may then operate to cause the restrictions to be removed from the user equipment 530 through the communications links 595 and infrastructure equipment 590. Thus, in the illustrated embodiment, the condition detection function 520 and the operator equipment 570 may impose restrictions, may share the responsibility for imposing the restrictions, or may be assigned certain capabilities for restricting the operation of the user equipment 530. Although not illustrated, this operation may continue in a loop until a triggering event occurs, such as the vehicle is turned off, the user equipment 530 is removed from the vicinity of the condition detection function 520, etc.

Thus, it can be appreciated from the illustrated exemplary systems in FIG. 2, FIG. 4 and FIG. 5, as well as the operation described in FIG. 3, that at least four operational configurations can be employed by various embodiments. These operational configurations are presented herein as non-limiting examples to further illustrate the operation of various embodiments.

One operational configuration includes fully or partially disabling user equipment functions via a detachable/pluggable apparatus (e.g. pluggable into the cigarette lighter slot). If the programmed condition is the car being in motion, the pluggable apparatus may contain a velocity sensor (such as an accelerometer or global positioning system function) and a BLUETOOTH wireless transceiver to signal that motion of the vehicle has been detected and notify the user equipment of such conditions. This operational configure can include software and/or hardware functionality in the user equipment to detect and authenticate the alert of the pluggable apparatus (condition detection function) "car-in-motion" in order to disable functionality of the user equipment, such as the notification of receipt of an incoming text message. In such an operational configuration, a BLUETOOTH peer-to-peer software protocol may be utilized to enable this to happen.

Another operational configuration operates to fully or partially disable functions of the user equipment via a detachable/pluggable apparatus (e.g. pluggable into the cigarette lighter slot). If the programmed condition is the car being in motion, the pluggable apparatus may contain a velocity sensor and a cellular modem radio to signal that motion of the vehicle has been detected and notify the user equipment of such condition through available GSM and/or other cellular protocols and channels used for the delivery of data, such as GPRS and Edge so that the operator can disable functions of the user equipment or prevent certain data from being sent to the user equipment, such as putting a hold on all SMS message forwarding to the user equipment.

Another operational configuration includes fully or partially disabling user equipment functions (such as SMS messaging features) utilizing the speedometer reader in a car computer and through a BLUETOOTH wireless transceiver, built-in or plugged into the car computer. The car computer then signals the condition being met (such as the vehicle being in motion or exceeding a threshold speed) to the user equipment and, the user equipment then self-imposes the restriction of the function. This operational configuration may utilize software and/or hardware functionality within the user equipment to detect and authenticate the alert of the condition detection function that the condition(s) is met prior to disabling the function(s), such as notification of receipt of incoming text messages. A BLUETOOTH peer-to-peer software protocol enables this capability.

Yet another operational configuration operates to fully or partially disable functions of the user equipment by utilizing the speedometer reader in a vehicle computer and through a radio modem to wirelessly signal that the conditions have been met, such as motion of the vehicle and/or threshold speeds of the vehicle to the operator equipment through available channels. For instance, if the modem is a cellular modem, the channels may include GSM and other cellular protocols and channels used for the delivery of data, such as GPRS and Edge so that the Mobile operator can restrict the functionality of the user equipment, such as putting a hold on all SMS messages forwarded to a cellular telephone user equipment.

It should be appreciated that non-limiting examples of technology, equipment and communication protocols are presented herein to provide a clear understanding but, the various embodiments should not be restricted to such disclosure. Other technologies can be employed and are anticipated. For instance, in one embodiment, the operator equipment may be based on paging technology such as POCSAG, FLEX, etc. Analog cellular equipment may also be utilized with the implementation of CDPD technology. Proprietary communication channels and technologies are also anticipated.

Two of the capabilities that are mentioned in the above-described operational configuration and embodiments a) motion sensing and b) Blue-tooth peer-to-peer communication are now further explained.

Motion sensing: Motion sensing can be provided in a variety of manners in various embodiments and, one or more of the techniques may be incorporated into the various embodiments. On technique is by the use of accelerometers. Accelerometers are useful in detecting velocity, such as the speed and direction of motion. Multiple accelerometers may be used to detect motion in various planes. For instance, the X-Y plane may be used to indicate forward and backward motion. The Z plane can be added to identify when the vehicle is turning. Further, the Z plane can be used in aircraft to determine if the aircraft is ascending or descending. GPS technology may also be used to detect motion and velocity. The speedometer of the vehicle may also be used to detect motion and velocity. In aircraft, other devices may be used to detect altitude, air speed, etc. Similarly, speedometer technology employed in marine vehicles may also be utilized as well as the above-listed technologies.

Bluetooth peer-to-peer: BLUETOOTH peer-to-peer is a communication standard protocol that has been established by standards bodies to allow wireless data transfer of devices using BLUETOOTH wireless radio. In various embodiments, the device detecting a motion, such as the condition detection function, may establish a peer-to-peer session with the user equipment (i.e., a cellular telephone as a non-limiting example). The cellular telephone may utilize a software application running within the cellular telephone and/or hardware that will allow this peer-to-peer communication to happen. The software application and/or hardware may further authenticate the transmitting device and interpret its message. Once the message is interpreted the application and/or hardware may then disable a feature or features of the cellular telephone, such as the notification feature of the SMS receiving routine. In such embodiments, the two devices communicating the protocol need to be paired up initially so that subsequent authentications may occur successfully.

In embodiments that utilize operator equipment to help control and/or restrict the user equipment functions, the condition detection function communicates to the operator equipment through a data modem offered and/or authorized by the operator itself. The modem and the service is readily available and do not need to be created but, as mentioned above, new technologies may be created for such capabilities.

Implementation Example 1

One exemplary embodiment may provide a near real-time messaging and alerting system for detecting a motor vehicle in motion, and further disabling the SMS text messaging features of the driver's mobile (cellular) telephone. In this exemplary embodiment, a car pluggable apparatus and a wireless communication protocol between said apparatus and mobile telephone are employed. The apparatus includes an accelerometer to detect speed and direction and/or velocity of the vehicle. The communication protocol is utilized to send signals to the mobile telephone to cause the disablement of the SMS text messaging features of the driver's mobile telephone.

Implementation Example 2

Another exemplary embodiment may provide a near real-time messaging and alerting system for detecting a motor vehicle in motion, and further disabling the SMS text messaging features of the driver's mobile (cellular) telephone. In this exemplary embodiment, a vehicle installed computer or entertainment and control center utilizes a wireless communication protocol between the vehicle computer and the mobile telephone. The vehicle computer may include a connection to the internal vehicle signals to detect and receive the vehicle speed. Through the transmission of signals utilizing the communication protocol, the vehicle computer can invoke the disablement of the SMS text messaging features of the driver's mobile telephone.

Implementation Example 3

Another exemplary embodiment may provide a near real-time messaging and alerting system for detecting a vehicle being in motion, and further disabling the SMS text messaging features of the driver's mobile (cellular) telephone. In this exemplary embodiment, a car pluggable apparatus includes an accelerometer to detect speed and direction and/or velocity of the vehicle and a radio data modem compatible with operating cellular channels and in communication with a mobile operator. The motion of the motor vehicle is detected and signals conveying such information are transmitted to the mobile operator using said data modem. The mobile operator then operates to disable SMS test messages from being forwarded to driver's mobile telephone.

Implementation Example 4

Another exemplary embodiment may provide a near real-time messaging and alerting system for detecting a vehicle in motion, and further disabling the SMS text messaging features of the driver's mobile (cellular) telephone. In this exemplary embodiment, a vehicle installed computer or entertainment and control center includes a connection to the internal vehicle signals for reading or detecting the car speed. A radio data modem is attached to or embedded within the vehicle computer and is compatible with an operating cellular channels and in communication with a mobile operator. The motion of vehicle is detected and signals conveying such information are transmitted to the mobile operator using said data modem. The mobile operator then operates to disable SMS text messages from being forwarded to driver's mobile phone.

Implementation Example 5

Another exemplary embodiment may provide a method for disabling the SMS text messaging notification features of mobile telephones using a BLUETOOTH wireless peer-to-peer protocol between a commanding device and the mobile telephone. The method includes initializing the BLUETOOTH technology to create a pairing between the commanding device and the mobile telephone. A messaging session includes sending a prescribed command to the mobile telephone from the commanding device. An authentication routine may be executed by the mobile telephone to authenticate the prescribed command. A command interpretation and execution routine then disables the alerting and notification of SMS text messages received by the mobile telephone.

User Equipment Detection

One aspect or function that can be incorporated into various embodiments is the use of RFID technology for the detection of the user equipment and verification of user equipment within the driver's ROI. An exemplary technique to enable this capability is through the use of a tag and detector, such as an RFID tag and detector as a non-limiting example. The tag can be embedded within, connected physically or wirelessly to, or simply be proximate to the user equipment. In such a configuration, the detector can then be placed in or near the driver's ROI. In other embodiments, the detector can be embedded within, connected physically or wirelessly to, or simply be proximate to the user equipment. In such a configuration, the tag can be placed within the driver's ROI.

The detection of the tag by the detector based on specific algorithms is used to "identify" the user equipment as being within the driver's ROI. This information by itself or combined with other information (such as detection of motion, the engine being on, the RPM of the motor, the speed of the vehicle, the gear position/status, geo-location/GPS/triangulation algorithms, etc.) can be used as a condition to turn on or off certain functionality of the user equipment (ie., text messaging, Internet access, call restriction and/or other keyboard/touch screen functionalities that are unsafe during driving).

In operation, if the tag is within the user equipment, a device external to the user equipment sends out an excitement signal which triggers the tag to transmit its signal. The detector can be located in the driver's ROI and detect that a tag associated with the user equipment has transmitted its signal and thereby conclude that the user device is within the driver's ROI. If the tag is external to the user equipment, the user equipment may send out an excitement signal. The user equipment or an external device can then detect the transmission of the tag and the excitement signal and determine that the user equipment is within the driver's ROI.

RFID stands for radio frequency identification. It is an automatic identification technology whereby digital data encoded in an RFID tag or "smart label" is captured by a detector using radio waves. In essence, RFID is similar to bar code technology but uses radio waves to capture data from tags, rather than optically scanning the bar codes on a label. RFID does not require the tag or label to be seen to read its stored data. Information is sent to and read from RFID tags by a detector or reader using radio waves. In passive systems, which are the most common, an RFID reader transmits an energy field that "wakes up" the tag and provides the power for the tag to respond to the reader. In active systems, a battery in the tag is used to boost the effective operating range of the tag and to support additional features over passive tags, such as temperature sensing. The data collected from the tag can be used to identify equipment associated with the tag. Passive smart label RFID systems offer unique capabilities as an automatic data capture system in that they: provide real-time, wireless transmission of data without human intervention; do not require line-of-site scanners for operation; allow stored data to be altered during sorting or allow workflow process information to be captured with the data; and work effectively even in harsh environments with excessive dirt, dust, moisture, and extreme temperatures.

If the tag is installed within the user equipment, the detector/reader in an RFID based embodiment may send out a signal to detect all tags in the vicinity and based on the information received, determine what user equipment is within a defined zone and operate accordingly. It should be appreciated that some tags are active, meaning they can transmit their signals without being excited or actuated, while other tags are passive meaning that they transmit their signal only when excited or actuated. Throughout the description, it should be appreciated that either technology could be used and any reference to "detecting" a tag or sending a signal to "activate a tag" should be assumed to be only an example of one particular type of tag but, the other technology could be substituted as well. Thus, if the navigation system for a vehicle includes a tag, the system may detect such and choose to not disable any functions of the navigation system or simply to ignore that tag. However, if a cellular telephone is detected, certain features of the cellular telephone may be disabled.

If the tag is embedded within or associated with a zone within the vehicle, then a detector/reader within the user equipment can send out a signal to determine if a user equipment restriction tag is in the same zone as the user equipment. If the vehicle includes multiple tags, the ID of a user equipment restriction tag may be pre-programmed into the user equipment. As another example, if multiple tags are located within the range of the user equipment, the user equipment can analyze the tag signals to determine which zone the user equipment is within.

In should be appreciated that other technologies may also be employed for the detection of user equipment and the use of RFID technology is simply one non-limiting example. Other technologies may include, as non-limiting examples, BLUETOOTH pairing, any RF based handshaking protocol such as transmissions in the unlicensed frequency spectrum, INFRARED technology, Ultra Wideband technology, Impulse Radio Technology, Personal Area Networks, etc. For instance, the vehicle may be equipped with small transmitters located at various locations within the vehicle. In such a configuration, the use of triangulation technology may be used within the vehicle by various components of the system (i.e., the user equipment) to determine if the user equipment is within the driver's ROI. In other exemplary embodiments, camera systems can be set up within the vehicle to visually monitor the location of user equipment and define zones within the vehicle.

In some embodiments, any user equipment that is in the proximity of the vehicle may be detected and controlled. The detection and control can be as simplistic as a Boolean operation: if user equipment is in vicinity, disable certain functions, or the detection and control can be more robust by being based on various conditions, parameters and heuristics. As a non-limiting example, the user equipment detection function can define the ROI and only operate to control user equipment within that ROI. Further, only certain classes of user equipment within the ROI may be subjected to control. In addition, the user equipment within the ROI may be totally disabled or, only portions of the functionality may be disabled, or the user equipment may be totally or partially disabled based on various other conditions.

In some embodiments, multiple zones can be defined within the vehicle and user equipment may be controlled depending upon which zone it resides. For instance, user equipment within the driver's ROI may be restricted at a first level, user equipment in the front seat may be controlled at a second level, user equipment in the rear of the vehicle may be controlled at yet a third level, etc. For instance, tags or detectors may be installed in various locations such as the steering wheel, driver's door, under driver's seat, in the visor, in the headliner, as well as throughout the vehicle in various other locations.

In addition, various embodiments may operate to continuously monitor and assess the location of user equipment and apply restriction control based on current positions. For instance, user equipment that is located in the driver's ROI may be disabled from answering an incoming call but may still signal a ring tone to indicate that a call is being received. If the user equipment is passed into a different zone, the restrictions may be relaxed thus allowing a passenger to answer the incoming call.

Detection of Conditions

The condition detector function can operate to detect one or more of a variety of operational and environmental conditions of the vehicle or equipment that is associated with the various embodiments. In addition, a variety of technologies may be utilized for detecting such operational and/or environmental conditions. A few non-limiting examples are provided in this section.

As previously presented, the use of accelerometer technology can be used to detect motion, velocity, speed, etc. of the vehicle. Using accelerometer technology can be accomplished by an accelerometer that is embedded within the user equipment, the vehicle, or a within a device to which the user equipment and/or vehicle interface. For example, the accelerometer may be embedded within or coupled to the tag, the detector, the condition detection function, the vehicle computer system etc.

The use of the global positioning system (GPS) may also be used to detect motion, speed, velocity, location, etc. of the vehicle. The GPS technology can embedded within the user equipment, the vehicle, or a within a device to which the user equipment and/or vehicle interface. For example, the accelerometer may be embedded within or coupled to the tag, the detector, the condition detection function, the vehicle computer system etc.

Another technology that may be employed to detect motion, speed, velocity, location, etc., of the vehicle is triangulation. Triangulation operates by detecting signals, usually three or more, that are transmitted from known locations, such a mobile telephone towers. By analyzing the propagation characteristics of the received signals, the location of the vehicle can be identified. By taking period samples and comparing the results, the direction, speed, motion, velocity, etc., of the vehicle can be determined.

Yet another technology that may be used to detect motion, speed, velocity, location, etc., of the vehicle is OBD technology. OBD is an acronym for On-Board Diagnostic System. OBD technology was birthed out of a desire to operate vehicles is a more environmental friendly manner. The technology introduced various sensors and data communications capabilities within the vehicle to enable the detection of problems that may result in environmentally unfriendly operation of the vehicle. A typical OBD system includes an engine control module (ECM) that monitors critical and emission related components for proper operation and triggers an alarm condition (i.e., illuminating an indicator lamp on the instrument panel) when a malfunction is detected. The OBD system also provides for a system of diagnostic trouble codes (DTC) and fault isolation logic charts to assist technicians in determining the likely cause of engine control and emissions system malfunctions. As such, the original generation of OBD systems included the ability to monitor all major engine sensors, fuel metering system and exhaust gas recirculation functions. Subsequent generations of OBD technology, such as OBD-II add and enhance the vehicle operation monitoring capabilities. Some of the monitoring capabilities in OBD-II include throttle position sensor, idle air control valve, oxygen sensors, manifold absolute pressure sensor, etc. Today, many operational features are all interconnected within a data bus system within a vehicle and interconnected with an in-vehicle computer. The in-vehicle computer can monitor the data over the bus to determine a variety of information including vehicle speed, miles traveled, driving statistics, braking statistics, operation of head lamps, seat belts, entertainment systems, windshield wipers, etc. As such, embodiments that exploit this technology can be used to obtain operational information of the vehicle such as the engine being on or off, the RPM, the speed, gear positions, etc.

Another technology that can be employed is the use of video cameras integrated within or installed within the vehicle. The audio detectors and cameras can be used to monitor internal events and external events. Thus, the cameras, along with video processing technology and a processing unit can determine the speed of the vehicle by monitoring the speed at which objects external to the vehicle are passed or by looking at the speedometer. It will be appreciated that such technology may also be utilized to identify a variety of other operational and environmental characteristics such as time of day, ambient light, weather conditions, noise level within the vehicle, etc.

Algorithm to Detect Speed Using Accelerometer

One of the conditions that may be utilized in determining whether to apply restrictions on the user equipment is when the user equipment is present in a moving vehicle, and particularly when it is located in the driver's ROI. As previously described, any of the embodiments and variants thereof may utilize one or more accelerometers to detect movement and/or speed of a vehicle. As a non-limiting example, an algorithm is presented following that presents one technique that can be used to determine movement and/or speed of the vehicle using the accelerometer.

Figure 7:
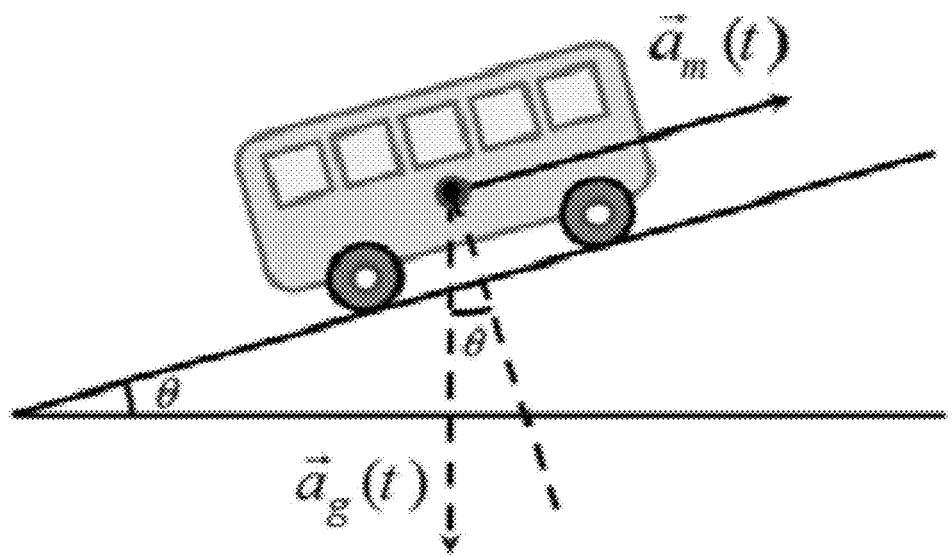
FIG. 7 is a schematic diagram, which shows the various forces that are acting on a vehicle.

In reviewing the following formulas, attention is directed to FIG. 7, which shows the various forces that are acting on a vehicle. At any given moment, two main forces act on objects inside a vehicle. These forces are represented as follow:

$m \cdot \vec{a}_m(t)$ represents the force that can be applied to the movement of the vehicle due to drive from the engine and friction from the braking system $m \cdot \vec{a}_g(t)$ represents force of gravity on the vehicle In addition to these two forces, there are background forces due to various reasons including, but not limited to, the engine being on, the vehicle hitting road bumps and rough terrain, etc. These forces are referred to herein as intrinsic forces and are represented as follows:

$m \cdot \vec{a}_{int}(t)$ represents intrinsic forces applied to the vehicle in operation The intrinsic forces have high frequency components. So, the effective forces applied to the vehicle are simply the sum of the above-listed forces, namely $$\vec{a}_{effective}(t) \triangleq \vec{a}_{eff}(t) = \vec{a}_g(t) + \vec{a}_m(t) + \vec{a}_{int}(t)$$

The speed of the vehicle can be determined by from data collected or received from one or more accelerometers and analyzed in view of the above-listed forces. As such, a processing unit receives readings from an accelerometer. These readings are represented as follows:

At time t=0 (initialization), the vehicle is not moving. And so, the force due to the engine is zero and is represented as:

$$\vec{a}_m(0) = 0 \text{ (no movement)}.$$

Therefore, the effective forces at time t=0 can be simplified as:

$$\vec{a}_{eff}(0) = \vec{a}_g(0) + \vec{a}_{int}(0).$$

Note that $\vec{a}_g(0)$ is stationary and only has DC component, so if F{.} represents a digital low pass filter to remove the high frequency components due to the intrinsic forces (for instance you can assume a simple FIR), that does averaging then $$F\{\vec{a}_{eff}(0)\} \approx A_F \cdot \vec{a}_g(0)$$

where $A_F$ is assumed to be a constant (let AF=1 for now).

As a result we have $$\vec{a}_{int}(0) = \vec{a}_{eff}(0) - \vec{a}_g(0) = \vec{a}_{eff}(0) - F\{\vec{a}_{eff}(0)\}$$

In motion, we have the following $$F\{\vec{a}_{eff}(t) - \vec{a}_g(0)\} = \vec{a}_m(t)$$

Thus, the acceleration in the direction of motion of the vehicle (vector) equals the effective acceleration (as observed by the motion sensor), minus the initial gravitational acceleration.

$\vec{a}_g(t) \cdot \sin(\theta)$ counters upward motion (or it contributes to downward motion/force) and needs to be calculated. Because the dot product of any two given vectors is related to the angle between the two vectors (assume the angle is a) according to the following relation:

$$\vec{v}_1(t) \cdot \vec{v}_2(t) = |\vec{v}_1(t)| |\vec{v}_2(t)| \cos(\alpha)$$

where ('.') is the 'dot' product of two vectors, then we have $$\alpha = \cos^{-1}\left\{\frac{\vec{v}_1(t)}{|\vec{v}_1(t)|} \cdot \frac{\vec{v}_2(t)}{|\vec{v}_2(t)|}\right\}$$

However, assuming that each of the accelerometer axis are lined up with the car axis, we can write the following expression:

$$\alpha = \begin{cases} \frac{\pi}{2} + \theta, & \text{if the car is moving up on the hill} \\ \frac{\pi}{2} - \theta, & \text{if the car is moving down on the hill} \end{cases}$$

or $$\cos(\alpha) = \begin{cases} \cos(\frac{\pi}{2} + \theta) = -\sin(\theta), & \text{if the car is moving up hill} \\ \cos(\frac{\pi}{2} - \theta) = \sin(\theta), & \text{if the car is moving down hill} \end{cases}$$

Also, note that what acts on the objects inside the car can be represented by the following expressions:

$$\begin{cases} |\vec{a}_m(t)| - |\vec{a}_g(t)|\sin(\theta), & \text{(the car is moving up on the hill)} \\ |\vec{a}_m(t)| + |\vec{a}_g(t)|\sin(\theta), & \text{(the car is moving down on the hill)} \end{cases}$$

Combining the above equations, in can be seen that regardless of moving up on the hill or moving down on the hill, what acts on the objects inside the car is given by the following relationship:

what acts on the objects inside the car=$|\vec{a}_m(t)|+|\vec{a}_g(t)|\cos(\alpha)$ where $\alpha$ is the angle between $\vec{a}_m(t)$ and $\vec{a}_g(t)$. (because we are looking at the entire forces/accelerations in the direction of motion on the road).

The algorithm operates by initially calculating $\vec{a}_g(0)$ and then finding the sum of the square of the absolute values of $\vec{a}_{int}$ as follows:

$$\Sigma |\vec{a}_{int}|^2,$$

which is the high frequency energy ($E_h$) while car is not moving.

After initialization, speed will be calculated periodically or a periodically. As a non-limiting example, the algorithm may operate to calculate the speed approximately every 0.1 sec. In addition, the high frequency energy is also calculated. Also, at any time the car is believed to be at a constant speed for more than a threshold period of time (i.e. approximately 0.5 sec as a non-limiting example), the value of $\vec{a}_g(t)$ can be recalculated or updated.

Figure 8:
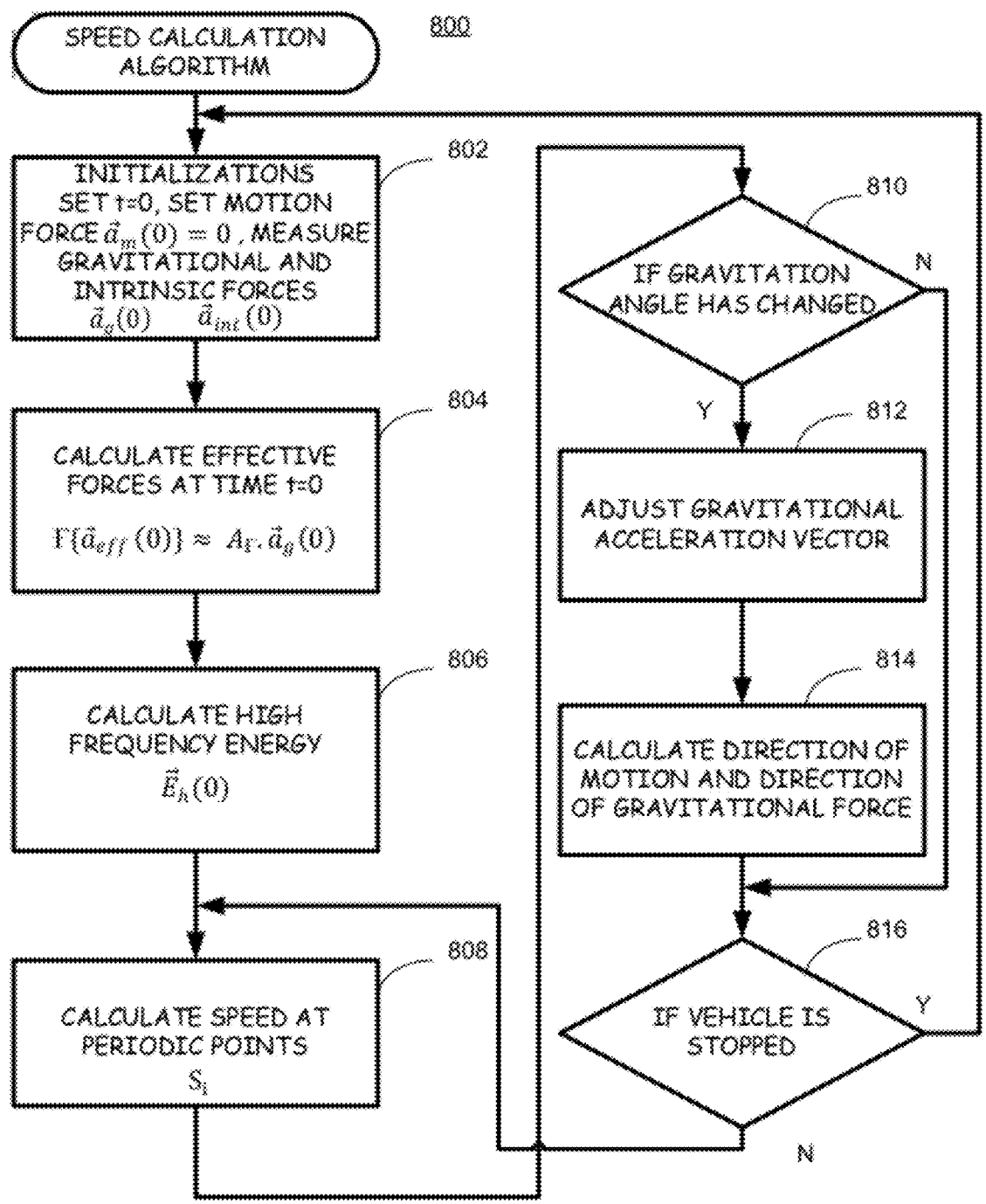
FIG. 8 is a flow diagram illustrating exemplary actions that can be taken by an exemplary algorithm used to calculate the speed of a vehicle utilizing an accelerometer to obtain input information.

FIG. 8 is a flow diagram illustrating exemplary actions that can be taken by an exemplary algorithm used to calculate the speed of a vehicle utilizing an accelerometer to obtain input information.

Initialization

The algorithm 800 is initialized by setting time t=0 802 and setting the value of $\vec{a}_m(t)$ to zero as well knowing that the vehicle is not currently in motion. The force of gravity and the high frequency energy at time t=0 is then measured or calculated as well.

The algorithm then operates to calculate $\vec{a}_g(0)$ and then the effective forces at time t=0 $F\{\vec{a}_{eff}(0)\}$ 804.

Adjust for $A_F$, if $A_F \neq 1$ and record the following values $a_{eff}(0)_x, a_{eff}(0)_y, a_{eff}(0)_z$ Calculate high frequency energy $\vec{E}_h(0)$ 806

$\vec{a}_{int}(0) = \vec{a}_{eff}(0) - \vec{a}_g(0)$, calculate 1 second average energy as follows:

$$\vec{E}_h(0) = \left[ \sum_{i=0}^{1\,sec} \vec{a}_{int_x}(i)^2, \sum_{i=0}^{1\,sec} \vec{a}_{int_y}(i)^2, \sum_{i=0}^{1\,sec} \vec{a}_{int_z}(i)^2 \right]$$

divided by the number of samples in one second.

Speed Calculation

The speed is calculated and adjusted, if necessary, periodically (i.e., every 0.1 seconds as a non-limiting example 808).

$$F\{\vec{a}_{eff}(i) - \vec{a}_g(0)\} = F\{\vec{a}_m(i)\}$$

$$\text{speed}(i) = S_i$$

$$= S_{i-1} + \Delta t |\vec{a}_g(i)| \cos(\alpha) + \sum_{I=10}^{i} |(F\{\vec{a}_m(i)\})|\Delta t$$

Where, $S_O=0$ and $|\vec{a}_g(i)|=|\vec{a}_g(0)|$ for ten samples taken once every 0.01 seconds for a 0.1 second window of time.

Calculate $\vec{E}_h(i)$ over a particular time span (i.e., over an approximately 0.1 second time span.

Define $\mathbf{H} \triangleq \text{HPF}$.

To find $\mathbf{H}\{\vec{a}_{eff}(i)\}$ calculate $$E_h = \sum_i |\mathbf{H}\{\vec{a}_{eff}(i)\}|^2$$

Divide by number of samples in the time period (i.e., 0.1 seconds). This obtains the total energy with low frequency items removed, and thus eliminating the effect of the engine torque, bumps, etc.

Next, check to see if $F\{\vec{a}_{eff}(i)\} \approx |\vec{a}_g(0)|$ within g±2%.

This function operates to determine if the magnitude of the effective acceleration equals that of time zero (no motion condition) 810. If so, then it is determined that the gravitation angle has changed and thus the change in gravitational acceleration vector can be calculated and adjustments are made by overwriting the value as follows:

$\vec{a}_g(0)$ is overwritten with $F\{\vec{a}_{eff}(i)\}$ as the new value of $\vec{a}_g(0)$ 812.

Next, the change in the Am angle (direction of motion), call it Lambda, is calculated and the Ag-Lambda (direction of gravitational force) is adjusted 814.

Finally, the process checks to see if the motion has stopped 816. Stopped can be defined as absolutely zero movement or can approximate zero movement (i.e., approximately less than 5 km/hour for more than approximately 0.5 seconds as a non-limiting example)

$$S_i \approx 0$$

and $E_h(i)$ is within 98% of $E_h(0)$ for at least approximately 1 second indicating that the vehicle is not receiving any forces due to bumps from moving on the terrain because the energy at $E_h(i)$ approximates the energy of $E_h(0)$ when the vehicle was not moving. If the vehicle has stopped moving, then the process is reinitialized 802. Otherwise, the speed is continuously calculated 808.

Application of Restrictions

When the condition detection function identifies that conditions for applying restrictions are detected, the restrictions can be applied to relevant user equipment. Further, when the condition detection function determines that the conditions have changed or have been relinquished, new restrictions can be applied or all restrictions may be removed as appropriate. In some embodiments, a time delay may be imposed on the removal of restrictions thus requiring the conditions to be removed or the user equipment to be out of the driver's ROI for a required period of time before the restrictions are relaxed or removed. It should be appreciated that a wide variety of conditions and restrictions can be applied in various embodiments and conditions and can depend upon a wide array of factors. The present disclosure anticipates this and as such, applies in any such configuration.

Returning to the RFID based exemplary embodiment, a further example of operation is presented. Once the detector identifies the tag as being in the driver's ROI, it uses this information by itself or combined with any other information (such as detection of motion, engine being on, RPM, speed of the vehicle, gear position/status, geo-location/GPS/triangulation algorithms, etc.) to do one or a combination of two or more, as well as other functions, including the following:

Communicate with the user equipment (via wireless or wired communication path) to disable or cause to be disabled "distracting functionalities/services" of the user equipment. As such, the detector is communicatively coupled with the user equipment using any of a variety of communication technologies. As non-limiting examples, the communication technologies may include wireless technologies, such as a BLUETOOTH transmitter integrated with/connected to the detector and communicating with the user equipment, instructing it (or software applications or hardware functions within the user equipment) to disable the distracting functionalities.

Alternatively or in addition, as presented above, the detector may communicate with a communications system operator that controls the delivery of communications to the user equipment to request the disablement of such functions. For instance, if the user equipment is a mobile telephone, the detector may communicate using any of a wide variety of communication technologies with the mobile telephone service operator or carrier to request disabling of any or any combination of the "distracting functionalities/services". For example, a cellular modem may be embedded or connected to the detector, which would be used to inform the mobile operator (e.g., via SMS or other services), or a BLUETOOTH transmitter/modem connected to or embedded within the detector unit would communicate with the driver's handset, which would in turn communicate with the mobile provider in order to temporarily disable the distracting functionalities/services.

In addition to, or alternatively to providing restrictions on the user equipment, embodiments may perform other actions or functions under certain conditions. For instance, if certain conditions are active, an embodiment may operate to perform an action to warn (e.g., by using sound/noise, lights, vibration, etc.) the driver or others in or around the vehicle (e.g., warning the other cars by sounding the horn, flashing of the lights, etc.) of the existence of the conditions. For example, if the driver engages in risky behavior, such as texting while driving, such an embodiment can operate to perform actions such as sounding the horn, turning on hazard lights, flashing the headlights, etc. to provide an alert to nearby driver's to be cautious when approaching this vehicle. Such actions may also be used to alert other passengers in the car, especially a sleeping passenger, of the perilous activity and allow them the opportunity to take remedial action, such as request the driver to stop the dangerous activity. As another example, if the detector is a pluggable unit, the pluggable unit itself can have flashing lights and sounds to gain the driver's or others' attention, and in case of Bluetooth or other wireless communication with the handset, the handset can inform of the driver's risky behavior via sounds, vibration, etc.

Similarly, embodiments may operate to inform a third party of the dangerous activity thus allowing others to take remedial measures or to levy consequences for the behavior. For instance, if the driver is engaged in the activity of texting while driving, the driver's parents can be notified via a text message. Similarly, the driver's insurance company or law enforcement officials can also be notified of the activity. Thus, it will be appreciated that in any of the embodiments described herein, the application of the various technologies can enable the third party to be notified. In addition or alternatively, a log can be kept by one or more of the components of the system to identify if and when dangerous activities were conducted. This log can be down loaded automatically to parents, insurance companies, etc., or simply requested from time to time.

In any of the above-described application of restrictions scenarios, once the conditions for applying the restrictions, warnings or notices are removed, cease to exist or are changed, the various embodiments can operate to remove and/or change the restrictions and/or provide follow-up warnings or notifications. For instance, the detector can communicate with the handset to enable any or any combination of the previously applied restrictions. Similarly, the detector can communicate with the service operator of the user equipment (i.e., a mobile telephone system operator) to request the removal of the restrictions on the user equipment. Likewise, the embodiment can cease or remove the application of the warning signals that may be active and/or send a communication to the third party indicating the removal or change of the conditions.

Additional Examples of Various Aspects of Embodiments

As previously presented, a combination of techniques/examples can be incorporated into the various embodiments. As specific non-limiting examples to further provide an understanding of some of these techniques, a few examples are provided.

Example 1

Presence Restriction. In a simplified embodiment, the system may operate to simply detect the presence of user equipment within the driver's ROI and then disable some or all functions of the user equipment.

Example 2

Simplistic Conditional Restriction. In this embodiment, they system may operate to detect the presence of user equipment within the driver's ROI and then if one or more additional conditions are met, then operate to disable some or all functions of the user equipment. For instance, if the user equipment is in the driver's ROI and the car is moving, text-messaging can be disabled.

Example 3

RFID Tag In User Equipment Based System. The tag can be attached to or integrated with the user equipment (e.g., placed on or built into the user equipment or another unit within the user equipment such as a SIM card for a cellular telephone). The detector is available either as an external apparatus (can be a unit pluggable into the vehicle's electric outlet or battery operated), or can be integrated into the car's components (e.g., car's built in GPS, car's computer, etc.). The detector is placed within or built in within the Driver's ROI.

The signal-to-strength ratio (SNR greater than a certain threshold) is used to detect the presence of a tag within certain proximity of the detector. In order to minimize false tag detection (e.g., from handsets in the passenger seat or elsewhere), signal averaging or/and other algorithms may be incorporated. For example, several N consecutive detections of the same tag (with SNR greater than the threshold) within a certain time period can be used to "identify" that the detected tag is within the driver's ROI. Once the tag is identified as being within the Driver's ROI, any one or combination of the following conditions may be checked for: (a) the ignition being on or the gear being in a specific position/setting, such as "Drive", (b) the RPM is above a certain threshold, (c) the vehicle speed being above a certain threshold, (d) weather conditions, (e) time of day, (f) location of vehicle, (g) traffic conditions, (h) other distractions within the vehicle, (i) identify of the driver (age, gender, experience, etc.), as well as a variety of other conditions. As previously presented, these conditions can be detected using a variety of technologies, as well as combinations thereof, including but not limited to, the OBDI port of the vehicle, signals received from an accelerometer, using GPS data, motion or speed detected via other means, such as car's rear view camera, triangulation, GPS, etc. Once the conditions are detected, restrictions can be imposed using any of the above-described techniques as well as other anticipated techniques. When the conditions are changed or eliminated, the restrictions can be changed or removed using any of the above-described techniques as well as other anticipated techniques.

Example 4

RFID Tag In Driver's ROI Based System. The tag is (or several tags) can be placed in the driver's ROI in a variety of fashions including being attached to or placed within or connected to any units within the driver's ROI. For example, the tag(s) maybe placed inside the stirring wheel or/and driver's door or/and under the driver's seat. The detector is integrated with or built into or connected to the user equipment (or it may be an apparatus connected to the user equipment).

In order to minimize false tag detection (e.g., handsets in the passengers' area/seat falsely detecting the tag(s) in driver's ROI, handset in driver's ROI not detecting the tag(s) in the driver's ROI due to interference, etc.), signal averaging or/and other algorithms may be incorporated. For example, several (n) consecutive detections of the same tag (with SNR greater than the threshold) within a certain time period can be used to "identify" that the tag(s) was/were correctly detected by the handset within the Driver's ROI. Or detection of several tags installed/attached in the driver's ROI may be necessary before the handset identifies itself as being in the driver's ROI.

Once the user equipment is identified as being within the driver's ROI, operation as outlined above can ensue.

Example 5

User Equipment Based System. In some embodiments, the user equipment may be implemented such as to be a self-governing system. For instance, the condition detection function may reside completely within the user equipment and as such, once conditions are detected, the restrictions can be imposed either by the user device directly or, reported to another system (i.e., a cellular operator) which then imposes the restrictions. In such embodiments, the user equipment may include an accelerometer that is used to detect one or more of the conditions. In addition, one or more of the techniques used to determine if the user equipment is within the driver's ROI can be used. For instance, if the vehicle is equipped with a tag, the user equipment can use the RFID technology to determine the location of the user equipment. Alternatively, if the accelerometer detects a threshold level of movement, the user equipment may conclude that it is within a moving vehicle and impose restrictions based on this knowledge alone. Rather than detecting the specific location of the user equipment, a receptacle within the vehicle that is out of reach and out of sight of the driver may be used for placement of the user equipment. If the user equipment is not within the receptacle, then functions can be automatically restricted when a threshold speed is detected.

The present disclosure has presented various techniques to determine the location of user equipment within a vehicle and especially the driver's ROI. Further, the various embodiments have presented techniques to detect various operating and environmental conditions using technologies such as accelerometers, BLUETOOTH wireless protocols, cellular data transport or advanced car computers to detect motion of a motor vehicle, triangulation and the like. Further, embodiments have been presented to describe various techniques for applying and removing restrictions in the operation or functionality of the user equipment. It should be appreciated that each embodiment has been presented as a non-limiting example and other embodiments that incorporate one or more features from any of the described embodiments, as well as other anticipated technologies and features are also anticipated.

Figure 6:
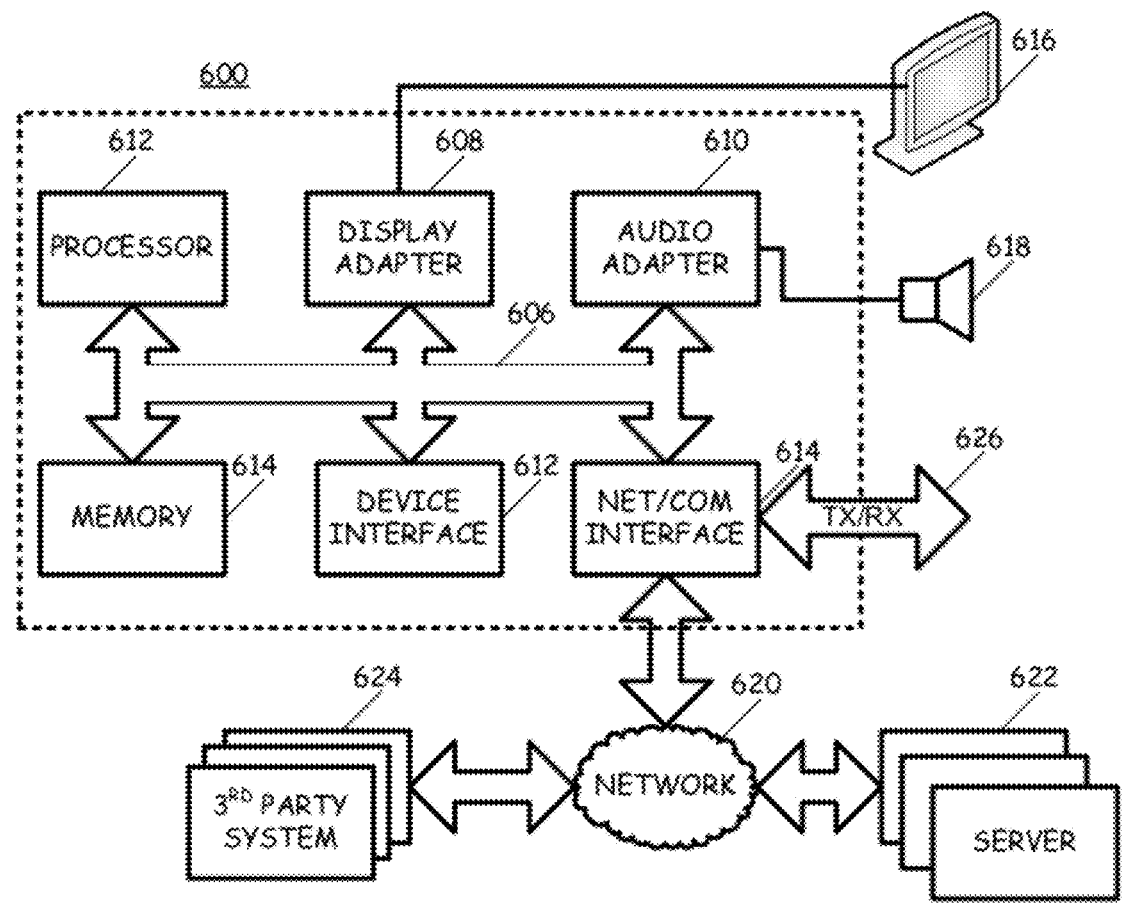
FIG. 6 is a functional block diagram of the components of an exemplary device that can incorporate one or more aspects of the various embodiments and that may be used in implementing aspects of the embodiments.

FIG. 6 is a functional block diagram of the components of an exemplary device that can incorporate one or more aspects of the various embodiments and that may be used in implementing aspects of the embodiments. For instance, the block diagram of FIG. 6, or variants thereof can be a suitable environment for the condition detection function, the user equipment, the user equipment operator interface, the operator and/or the interface device. It will be appreciated that not all of the components illustrated in FIG. 6 are required in all embodiments of the components but, each of the components are presented and described in conjunction with FIG. 6 to provide a complete and overall understanding of the components. In additional, some components are described in general terms and it is intended that various implementations are anticipated. Further, components that are described with specific terms and technology are provided as non-limiting examples and as such, other implementations are anticipated. The system, server or device can include a general computing platform 600 illustrated as including a processor or processing unit 612 and a memory device 614. The processing unit 612 and the memory device 614 may be integrated together, such as a micro-controller, or they may be communicatively coupled over a bus or similar interface 606. The processor 612 can be any of a variety of processor types including microprocessors, micro-controllers, programmable arrays, custom IC's etc. and may also include single or multiple processors with or without accelerators or the like. The memory element of 614 may include a variety of structures, including but not limited to RAM, ROM, magnetic media, optical media, bubble memory, FLASH memory, EPROM, EEPROM, etc. The processor 612, or other components may also provide components such as a real-time clock, analog to digital convertors, digital to analog convertors, accelerometers, etc. The processor 612 also interfaces to a variety of elements including a device interface 612, a display adapter 608, an audio adapter 610, an device interface 612 and network/communications interface 614. The device interface 612 provides an interface to external controls or devices, such as sensors, actuators or the like. For instance, for a condition detector function, the device interface 612 may be an interface to a GPS device, an OBD-I interface, etc. The display adapter 608 can be used to drive a variety of alert elements 616, such as display devices including an LED displays, LCD display, one or more LEDs or other display devices. The audio adapter 610 interfaces to and drives another alert element 618, such as a speaker or speaker system, buzzer, bell, etc. The network/communication interface 614 may interface to a variety of devices (not shown) such as a keyboard, a mouse, a pin pad, and audio activate device, a PS3 or other game controller, as well as a variety of the many other available input and output devices or, another computer or processing device 226. The network/communication interface 614 can also be used to interface the computing platform 640 to other devices through a network 620. The network may be a local network, a wide area network, wireless network, a global network such as the Internet, or any of a variety of other configurations including hybrids, etc. The network/communication interface 614 may be a wired interface or a wireless interface. The computing platform 640 is shown as being able to interface to a server 622 and a third party system 624 through the network 620. The network/communication interface 614 may also incorporate one or more of a variety of communication capabilities such as BLUETOOTH, cellular, cellular data, INFRARED, RF, direct connect, etc., for transmitting and receiving data or signal 626.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A method for restricting a functionality of user equipment that exists within a particular zone within a vehicle, the method comprising:
   a processing unit configured to perform actions of:
   determining that a location of the user equipment is physically within a particular zone of a plurality of zones, each of the plurality of zones being defined to exist at least partially within a vehicle, wherein at least one of the plurality of zones is within a driver's region of interest and at least one of the plurality of zones is outside of the driver's region of interest, wherein one or more tags are positioned with each tag being associated with one of the plurality of zones and a reader is physically coupled to the user equipment and, the reader receiving one or more transmissions from one or more of the tags and applying signal analysis to the received transmissions to determine a physical proximity of the user equipment relative to the one or more tags associated with the received transmissions thus identifying the location of the user equipment as within a particular zone;
   identifying one or more conditions with regards to a state of the vehicle;
   determining restrictions on the user equipment based at least in part on the identified one or more conditions of the vehicle and the particular zone in which the user equipment is located; and
   imposing the restrictions on a functionality of the user equipment while the conditions exist and while the user equipment remains within the particular zone.

2. The method of claim 1, wherein the reader is an RFID reader and the one or more tags are RFID tags with passive transmitters and, the action of determining the location of the user equipment further comprises the action of causing an actuation signal to be transmitted to actuate the one or more RFID tags to transmit a response signal and such transmitted response signals are the received transmissions.

3. A method for restricting a functionality of user equipment that exists within a particular zone within a vehicle, the method comprising:
   a processing unit configured to perform actions of:
   determining that a user equipment is physically within a particular zone of a plurality of zones that are defined to exist at least partially within a vehicle, wherein at least one of the plurality of zones is within a driver's region of interest and at least one of the plurality of zones is outside of the driver's region of interest, wherein one or more readers are positioned within each of the plurality of zones and one or more tags are physically coupled to the user equipment and, the one or more readers receiving one or more transmissions from the one or more tags and applying signal analysis to the received transmissions to determine a physical proximity of the user equipment relative to the one or more readers to determine a particular zone in which the user equipment is located;
   identifying one or more conditions with regards to a state of the vehicle;
   determining restrictions on the user equipment based at least in part on the identified conditions of the vehicle and the particular zone in which the user equipment is located; and
   imposing the restrictions on a functionality of the user equipment while the conditions exist and while the user equipment remains within the particular zone.

4. The method of claim 1, wherein the action of determining that a location of the user equipment is physically within a particular zone of a plurality of zones further comprises the actions of:
   applying signal analysis relative to one or more characteristics of the received transmissions to determine if the user equipment is within a particular zone of the plurality of zones; and
   wherein the action of determining restrictions on the user equipment comprises determining one set of restrictions if the user equipment is within a first zone and determining another set of restrictions if the user equipment is within a second zone within the vehicle.

5. The method of claim 1, wherein the action of the processing unit identifying one or more conditions further comprises:
   the processing unit detecting a speed of the vehicle; and
   if the vehicle speed exceeds a particular threshold, identifying a condition of a moving vehicle.

6. The method of claim 5, wherein the processing unit interfaces to an accelerometer and the action of the processing unit detecting a speed of the vehicle further comprises receiving a signal from the accelerometer indicating movement.

7. The method claim 5, wherein the processing unit interfaces to an on-board data system of the vehicle and, the action of detecting a speed of the vehicle further comprises receiving signals from the on-board data system indicating that the vehicle is moving.

8. The method of claim 1, wherein the action of imposing the restrictions on a functionality of the user equipment further comprises:
   sending a signal to the user equipment to notify the user equipment to invoke restrictions at the user equipment.

9. The method of claim 1, wherein the user equipment operates in conjunction with a service provider and, the action of imposing the restrictions on a functionality of the user equipment further comprises:

the processing unit sending a signal to a service provider of the user equipment to invoke the restrictions of the user equipment; and the service provider restricting a functionality of the user equipment at a service provider equipment.

10. A device for restricting a functionality of user equipment that is physically located and operating within a particular zone within a vehicle, the device comprising:
a processing unit that includes:
an interface to one or more sensors for detecting vehicle operating conditions;
a reader for receiving signal transmissions from one or more tags and for performing signal analysis of the received signals to determine when the user equipment is moved into and out of a particular zone of one of a plurality of zones within the vehicle, wherein at least one zone of the plurality of zones is a driver's region of interest and at least one zone of the plurality of zones is outside of the driver's region of interest, wherein the reader is physically connected to the user equipment; and
a controller interface for providing signals to invoke particular restrictions in a functionality of the user equipment wherein the particular restrictions are selected based on the particular zone in which the user equipment is located and the detected operating conditions and, providing signal to invoke different restrictions on the functionality of the user equipment if the detected operating conditions change or the user equipment is moved into a different zone of the plurality of zones.

11. The device of claim 10, wherein the interface to one or more sensors includes an interface to an accelerometer for detecting movement of the vehicle.

12. The device of claim 10, wherein the interface to one or more sensors includes an interface to an on-board data system of the vehicle.

13. The device of claim 10, wherein the interface to one or more sensors includes an interface to a global position system device for detecting vehicle movement.

14. The device of claim 10, wherein the reader comprises an RFID reader that is configured to send out an actuating signal to cause the one or more tags, wherein the tags are RFID tags, to transmit a response signal, the processing unit further performs signal analysis of one or more received response signals by detecting any transmissions from RFID tags and identifying a source and a location of the RFID tag by analyzing one or more characteristics of the response signals.

15. The device of claim 10, wherein the controller interface is configured to send signals to the user equipment to notify the user equipment to invoke the restrictions.

16. The device of claim 10, wherein the device includes BLUETOOTH technology and the reader receive and analyze BLUETOOTH signals from the user equipment to identify if the user equipment is within or proximate to the vehicle and if the user equipment is within one of a plurality of zones within the vehicle and, the controller interface sends signals to invoke one set of restrictions if the user equipment is within or proximate to the vehicle and to invoke additional restrictions if the user equipment is within a particular zone.

17. The device of claim 16, wherein the user equipment is a cellular telephone and the controller interface sends signals to the user equipment to invoke restrictions on the ability to receive and respond to text messages.

18. The device of claim 16, wherein the user equipment operates in conjunction with a service provider and, the controller interface is configured to send signals to the service provider, the signals requesting the service provider to invoke the restrictions on the user equipment.

19. The device of claim 10, wherein the user equipment is a cellular telephone and the controller interface sends signals to a cellular service provider to request the cellular service provider to prevent sending text messages to the cellular telephone.

20. A method for restricting a functionality of a multi-function cellular telephone that physically exists within a defined zone of a plurality of zones that exist within a vehicle, the method comprising:
a processing unit that is external to a cellular telephone and operating independently from the cellular telephone performing actions of:
detecting that the cellular telephone is within one of a plurality of zones that are defined to exist at least partially within a vehicle, wherein at least one zone is a driver's region of interest within the vehicle and at least one other zone is outside of the driver's region of interest but still within the vehicle;
identifying one or more conditions with regards to an operational state of the vehicle;
imposing restrictions on a functionality of the cellular telephone based at least in part on the identified conditions of the vehicle and a particular zone in which the cellular telephone is located;
maintaining the restrictions on the functionality of the cellular telephone while the conditions continue to exist and the cellular telephone remains within the particular zone; and
imposing a different set of restrictions on the functionality of the cellular telephone if the conditions of the vehicle change or the cellular telephone is moved out of the particular zone;
wherein the processing unit imposes the restrictions on the cellular telephone by sending signals to a cellular service provider for the cellular telephone to request the cellular service provider to prevent particular functions from operating on the cellular telephone.

21. The method of claim 3, wherein the one or more tags are RFID tags with passive transmitters and the one or more readers are RFID readers and, the action of determining that the user equipment is physically within a particular zone further comprises the action of causing an actuation signal to be sent to actuate the one or more RFID tags to transmit one or more response signals and such response signals are the received transmissions.

22. The method of claim 1, wherein the action of identifying one or more conditions further comprises the action of detecting a speed of the vehicle by:
(a) calculating an effective motion force, a gravitational force and an intrinsic force at a first point in time;
(b) calculating a high frequency energy at the first point in time;
(c) calculating a speed of the vehicle at the first point in time;
(d) if a gravitation angle changes, adjusting a gravitational acceleration vector;
(e) calculating a direction of motion and a direction of gravitational force;
(f) if the speed of the vehicle indicates the vehicle is not moving, continue at action (a), otherwise calculate the speed at this next point in time and continue at action (d).

23. A device for imposing first restrictions on operational functionality of user equipment that is located within a particular zone within a vehicle and imposing second restrictions when the user equipment is moved to a different zone within a vehicle, the device comprising:
- a processing unit that includes:
  - a sensor interface to one or more sensors that provides signals indicating one or more operating conditions of a vehicle;
  - a reader interface to one or more readers for reading received signals, each reader being located within a zone of a plurality of zones that are within the vehicle and being configured to receive signal transmissions from at least one tag that is physically coupled to the user equipment such that the at least one tag and the user equipment are always co-located;
  - an analyzer configured to perform signal analysis of the received signals to determine when the user equipment is moved into and out of a zone of the plurality of zones, wherein at least one zone of the plurality of zones is a driver's region of interest and at least one zone of the plurality of zones is outside of the driver's region of interest;
  - a transmission device interface wherein the processing unit actuate the at least one tag to cause the at least one tag to transmit a signal; and
  - a controller interface for providing signals to invoke first or second restrictions in a functionality of the user equipment wherein the first or second restrictions are selected based on the particular zone in which the user equipment is located and the one or more operating conditions of the vehicle.

24. The method of claim 1, wherein the reader is an RFID reader and the one or more tags are RFID tags with active transmitters and, the action of determining that a location of the user equipment is physically within a particular zone of a plurality of zones further comprises receiving transmitted signals from the one or more RFID tags.

25. The method of claim 3, wherein the one or more tags are RFID tags with active transmitters and the one or more readers are RFID readers and, the action of determining that a location of the user equipment is physically within a particular zone of a plurality of zones further comprises the action of receiving signals from the one or more RFID tags.

26. The method of claim 1, wherein the action of applying signal analysis to the received transmissions to determine the physical proximity of the user equipment relative to the one or more tags associated with the received transmissions further comprises analyzing a time diversity of the received transmissions.

* * * * *